US008934268B2

(12) United States Patent
Trainer et al.

(10) Patent No.: US 8,934,268 B2
(45) Date of Patent: Jan. 13, 2015

(54) POWER ELECTRONIC CONVERTER FOR USE IN HIGH VOLTAGE DIRECT CURRENT POWER TRANSMISSION

(75) Inventors: David Trainer, Alvaston (GB); Andre Paulo Canelhas, Wildwood (GB); Colin Charnock Davidson, Walton (GB); Carl David Barker, Walton Stone (GB)

(73) Assignee: Alstom Technology Ltd, Baden (CH)

( * ) Notice: Subject to any disclaimer, the term of this patent is extended or adjusted under 35 U.S.C. 154(b) by 106 days.

(21) Appl. No.: 13/639,844

(22) PCT Filed: Apr. 8, 2010

(86) PCT No.: PCT/EP2010/054660

§ 371 (c)(1), (2), (4) Date: Dec. 7, 2012

(87) PCT Pub. No.: WO2011/124258

PCT Pub. Date: Oct. 13, 2011

(65) Prior Publication Data

US 2013/0208521 A1 Aug. 15, 2013

(51) Int. Cl.
*H02J 3/36* (2006.01)
*H02J 1/10* (2006.01)
(Continued)

(52) U.S. Cl.
CPC .. *H02M 7/06* (2013.01); *H02J 3/36* (2013.01); *H02M 7/7575* (2013.01);
(Continued)

(58) Field of Classification Search
CPC ........... H02M 7/06; H02M 1/12; H02M 7/21; H02M 7/217; H02M 7/2176; H02M 2001/12; H02M 2007/217
USPC .................. 363/39, 44, 65–68, 125–132, 35; 323/205–208, 266
See application file for complete search history.

(56) References Cited

U.S. PATENT DOCUMENTS 3,867,643 A 2/1975 Baker et al.
4,053,820 A * 10/1977 Peterson et al. ................ 363/44
(Continued)

FOREIGN PATENT DOCUMENTS

DE 195 35 552 4/1996
DE 101 03 031 7/2002
(Continued)

OTHER PUBLICATIONS

Allebrod, S. et al., “New Transformerless, Scalable Modular Multilevel Converters for HVDC—Transmission”, Power Electronics Specialists Conference, IEEE, Jun. 15, 2008, pp. 174-179.
(Continued)

*Primary Examiner* — Timothy J Dole
*Assistant Examiner* — Yusef Ahmed
(74) *Attorney, Agent, or Firm* — Nixon Peabody LLP

(57) ABSTRACT

A power electronic converter for use in high voltage direct current power transmission and reactive power compensation which includes at least one converter limb including first and second DC terminals for connection in use to a DC network. The or each converter limb includes at least one first converter block and at least one second converter block connected between the first and second DC terminals. The or each first converter block includes a plurality of line-commutated thyristors and at least one first AC terminal for connection in use to an AC network. The or each second converter block includes at least one auxiliary converter including a plurality of self-commutated switching elements. The self-commutated switching elements are controllable in use to inject a voltage to modify a DC voltage presented to the DC side of the converter limb and/or modify an AC voltage and an AC current on the AC side of the power electronic converter.

21 Claims, 12 Drawing Sheets

30 54 56 28 28 54 56 58 40 20a 34 38

(51) Int. Cl.

| | |
|---|---|
| ***G05F 5/00*** | (2006.01) |
| ***H02M 7/06*** | (2006.01) |
| ***H02M 7/757*** | (2006.01) |
| ***H02M 7/797*** | (2006.01) |
| *H02M 1/12* | (2006.01) |
| *H02M 1/15* | (2006.01) |
| *H02M 7/483* | (2007.01) |

(52) U.S. Cl.

CPC ............... *H02M 7/797* (2013.01); *H02M 1/12* (2013.01); *H02M 1/15* (2013.01); *H02M 2007/4835* (2013.01); *Y02E 60/60* (2013.01)

USPC ................................ 363/35; 363/65; 323/205

(56) References Cited

U.S. PATENT DOCUMENTS

| | | | | |
|---|---|---|---|---|
| 4,816,736 | A * | 3/1989 | Dougherty et al. | 320/116 |
| 5,345,375 | A * | 9/1994 | Mohan | 363/40 |
| 5,499,178 | A * | 3/1996 | Mohan | 363/39 |
| 5,515,264 | A * | 5/1996 | Stacey | 363/132 |
| 5,532,575 | A | 7/1996 | Ainsworth et al. | |
| 5,644,482 | A | 7/1997 | Asplund | |
| 5,673,189 | A | 9/1997 | Schettler | |
| 5,719,486 | A * | 2/1998 | Taniguchi et al. | 322/28 |
| 5,726,557 | A * | 3/1998 | Umeda et al. | 322/21 |
| 5,889,667 | A * | 3/1999 | Bernet | 363/127 |
| 5,999,422 | A | 12/1999 | Goransson et al. | |
| 6,236,580 | B1 * | 5/2001 | Aiello et al. | 363/37 |
| 6,301,130 | B1 * | 10/2001 | Aiello et al. | 363/37 |
| 6,392,348 | B1 * | 5/2002 | Dougherty | 315/82 |
| 6,879,062 | B2 | 4/2005 | Oates | |
| 6,987,680 | B2 | 1/2006 | Vire et al. | |
| 7,274,576 | B1 | 9/2007 | Zargari et al. | |
| 7,292,462 | B2 | 11/2007 | Watanabe et al. | |
| 7,298,115 | B2 * | 11/2007 | Nishimura et al. | 322/28 |
| 7,499,291 | B2 | 3/2009 | Han | |
| 8,188,720 | B2 | 5/2012 | Kim et al. | |
| 8,390,259 | B2 | 3/2013 | Dommaschk et al. | |
| 8,599,591 | B2 | 12/2013 | Crookes et al. | |
| 2004/0218318 | A1 | 11/2004 | Bijlenga et al. | |
| 2005/0127853 | A1 | 6/2005 | Su | |
| 2005/0146226 | A1 * | 7/2005 | Trainer et al. | 307/73 |
| 2008/0002443 | A1 | 1/2008 | Ueda et al. | |
| 2008/0007978 | A1 * | 1/2008 | Han | 363/35 |
| 2008/0205093 | A1 | 8/2008 | Davies et al. | |
| 2008/0310205 | A1 * | 12/2008 | Hiller | 363/131 |
| 2010/0118578 | A1 | 5/2010 | Dommaschk et al. | |
| 2010/0309698 | A1 | 12/2010 | Asplund et al. | |
| 2011/0205768 | A1 | 8/2011 | Svensson | |
| 2011/0260701 | A1 | 10/2011 | Horger et al. | |
| 2012/0069610 | A1 * | 3/2012 | Trainer et al. | 363/35 |
| 2012/0113699 | A1 * | 5/2012 | Crookes et al. | 363/126 |
| 2012/0127766 | A1 * | 5/2012 | Crookes et al. | 363/126 |
| 2012/0170338 | A1 * | 7/2012 | Trainer et al. | 363/127 |
| 2012/0182771 | A1 * | 7/2012 | Trainer et al. | 363/51 |
| 2012/0188803 | A1 * | 7/2012 | Trainer et al. | 363/37 |
| 2013/0026841 | A1 | 1/2013 | Hosini et al. | |
| 2013/0051105 | A1 | 2/2013 | Wang et al. | |
| 2013/0094264 | A1 | 4/2013 | Crookes et al. | |
| 2013/0119970 | A1 | 5/2013 | Trainer et al. | |
| 2013/0128629 | A1 * | 5/2013 | Clare et al. | 363/35 |
| 2013/0128636 | A1 * | 5/2013 | Trainer et al. | 363/65 |
| 2013/0182467 | A1 * | 7/2013 | Cross et al. | 363/35 |
| 2013/0208514 | A1 * | 8/2013 | Trainer et al. | 363/35 |
| 2013/0279211 | A1 * | 10/2013 | Green et al. | 363/35 |
| 2014/0098575 | A1 | 4/2014 | Whitehouse | |

FOREIGN PATENT DOCUMENTS

| | | |
|---|---|---|
| EP | 1 800 391 | 6/2007 |
| GB | 2 294 821 | 5/1996 |
| GB | 2 418 079 | 3/2006 |
| WO | 97/02639 | 1/1997 |
| WO | 02/063758 | 8/2002 |
| WO | 03/055048 | 7/2003 |
| WO | 2007/028349 | 3/2007 |
| WO | 2007/028350 | 3/2007 |
| WO | 2008/086760 | 7/2008 |
| WO | 2009/149743 | 12/2009 |
| WO | 2010/025758 | 3/2010 |
| WO | 2010/069371 | 6/2010 |
| WO | 2010/088969 | 8/2010 |
| WO | 2010/145688 | 12/2010 |
| WO | 2010/145689 | 12/2010 |
| WO | 2010/145690 | 12/2010 |
| WO | 2010/149200 | 12/2010 |
| WO | 2011/012171 | 2/2011 |
| WO | 2011/012174 | 2/2011 |
| WO | 2011/050847 | 5/2011 |
| WO | 2011/098117 | 8/2011 |
| WO | 2011/113471 | 9/2011 |
| WO | 2011/127980 | 10/2011 |
| WO | 2011/157300 | 12/2011 |
| WO | 2012/013248 | 2/2012 |
| WO | 2012/167826 | 12/2012 |
| WO | 2013/000510 | 1/2013 |

OTHER PUBLICATIONS

Baran M. E. et al., “Overcurrent Protection in DC Zonal Shipboard Power Systems uisng Solid State Protection Devices”, Electric Ship Technologies Symposium, 2007. ESTS ’07. IEEE, IEEE, PI, May 1, 2007, pp. 221-224.

Glinka M., “Prototype of Multiphase Modular-Multilevel-Converter with 2MW Power Rating and 17-Level-Output Voltage”, 2004 35th Annual IEEE Power Electronics Specialists Conference, Jun. 20-25, 2004, pp. 2572-2576.

Guanjun Ding et al., “New Technologies of Voltage Source Converter (VSC) for HVDC Transmission System Based on VSC”, Power and Energy Society General Meeting—Conversion and Delivery of Electrical Energy in the 21st Century, 2008 IEEE, IEEE, Piscataway, NJ, USA, Jul. 20, 2008, p. 1-8.

Hagiwara, Makoto et al., “PWM Control and Experiment of Modular Multilevel Converters”, Power Electronics Specialists Conference, PESC 2008, IEEE, Piscataway, NJ, USA, pp. 154-161, (2008).

Hongbo, Jiang, et al., “Harmonic Cancellation of a Hybrid Converter”, High Power Electronics, The Royal Institute of Technology, Stockholm Sweden, IEEE Transactions on Power Delivery, vol. 13, No. 4, Oct. 1998, pp. 1291-1296.

Knudsen, L. et al., “Description and Prospective Applications of New Multi-Terminal HVDC System Concepts”, CIGRE Conf. Internationale Des Grands Reseaux Electriques, Aug. 26-Sep. 1, 1990, pp. 1-11.

Lesnicar, A. et al., “A New Modular Voltage Source Inverter Topology”, pp. 1-10, (2003), XP002454302.

Lesnicar, A. et al., “An Innovative Modular Multilevel Converter Topology Suitable for a Wide Power Range”, 2003 IEEE Bologna PowerTech Conference, Jun. 23-26, 2003, pp. 1-6.

Liu, Y.H. et al., “A New STATCOM Configuration Using Multi-Level DC Voltage Reinjection for High Power Application”, IEEE Transactions on Power Delivery, vol. 19, No. 4, Oct. 2004, New Zealand, pp. 1828-1834.

Liu, Y.H. et al., “A New High-Pulse Voltage-Sourced Converter for HVdc Transmission”, IEEE Transactions on Power Delivery, vol. 18, No. 4, Oct. 2003, New Zealand, pp. 1388-1393.

Qahraman, B. et al., “A VSC Based Series Hybrid Converter for HVDC Transmission”, IIEE 0-7803-8886-0/05 CCECE/CCGEI, Saskatoon, May 2005, pp. 458-461.

Raju, N. Ravisekhar, “A DC Link-Modulated Three-Phase Converter”, Silicon Power Corp., IEEE, 0-7803-7116-X/01, 2001, pp. 2181-2185.

Su, Gui-Jia et al., “Multilevel DC Link Inverter for Brushless Permanent Magnet Motors with Very Low Inductance”, Prepared by Oak Ridge National Laboratory for U.S. Dept. of Energy, 2001, IEEE 0-7803-7116-X/01, pp. 829-834.

Wong, C. et al., “Feasibility Study of AC and DC-Side Active Filters for HDVC Converter Terminals”, IEEE Transactions on Power Delivery, vol. 4, No. 4, Oct. 1989, New York, NY, USA, pp. 2067-2075.

(56) References Cited

OTHER PUBLICATIONS

Zhang, W. et al., “Active DC Filter for HVDC Systems”, IEEE Computer Applications in Power, vol. 7, No. 1, Jan. 1994, New York, USA, pp. 40-44.
PCT International Search Report and Written Opinion for Application No. PCT/EP2009/057388, mailed on Mar. 18, 2010.
PCT International Preliminary Report on Patentability in International Application No. PCT/EP2009/057388, mailed on Dec. 14, 2011.
PCT International Search Report and Written Opinion in International Application No. PCT/EP2009/057736, mailed on Mar. 26, 2010.
PCT International Preliminary Report on Patentability in International Application No. PCT/EP2009/057736, mailed on Nov. 24, 2011.
PCT International Search Report and Written Opinion in International Application No. PCT/EP2009/059973, mailed on Aug. 13, 2010.
PCT International Preliminary Report on Patentability in International Application No. PCT/EP2009/059973, mailed on Oct. 5, 2011.
PCT International Search Report and Written Opinion in International Application No. PCT/EP2010/051572, mailed on Jan. 19, 2011.
PCT International Preliminary Report on Patentability in International Application No. PCT/EP2010/051572, mailed on Apr. 20, 2012.
PCT International Search Report and Written Opinion in International Application No. PCT/EP2010/053290, mailed on Feb. 11, 2011.
PCT International Preliminary Report on Patentability in International Application No. PCT/EP2010/053290, mailed on Apr. 20, 2012.
PCT International Search Report and Written Opinion in International Application No. PCT/EP2010/054660, mailed on Feb. 24, 2011.
PCT International Preliminary Report on Patentability in International Application No. PCT/EP2010/054660, mailed on Jun. 6, 2012.
PCT International Search Report for International Application No. PCT/EP2010/054974, mailed on Mar. 4, 2011.
PCT International Preliminary Report on Patentability in International Application No. PCT/EP2010/054974, mailed on Aug. 10, 2012.
PCT International Search Report and Written Opinion in International Application No. PCT/EP2010/058630, mailed on Apr. 19, 2011.
PCT International Preliminary Report on Patentability in International Application No. PCT/EP2010/058630, mailed on Dec. 19, 2012.
PCT International Search Report and Written Opinion for Application No. PCT/EP2010/061145, mailed on Jun. 5, 2011.
PCT International Preliminary Report on Patentability in International Application No. PCT/EP2010/061145, mailed on Aug. 20, 2012.
PCT International Search Report and Written Opinion in International Application No. PCT/EP2011/059514, mailed on Jul. 5, 2012.
PCT International Preliminary Report on Patentability in International Application No. PCT/EP2011/059514, mailed on Aug. 1, 2013.
PCT International Search Report and Written Opinion in International Application No. PCT/EP2011/060907, mailed on Jul. 16, 2012.
PCT International Preliminary Report on Patentability in International Application No. PCT/EP2011/060907, mailed on Sep. 24, 2013.
Office Action in U.S. Appl. No. 13/388,277, mailed on Nov. 22, 2013.
Notice of Allowance in U.S. Appl. No. 13/378,336, mailed on Feb. 6, 2014.
Notice of Allowance in U.S. Appl. No. 13/380,500, mailed on Jun. 11, 2013.
Notice of Allowance in U.S. Appl. No. 13/380,500, mailed on Jul. 31, 2013.
Notice of Allowance in U.S. Appl. No. 13/576,920, mailed on Dec. 4, 2013.
Notice of Allowance in U.S. Appl. No. 13/576,920, mailed on Mar. 20, 2014.
U.S. Appl. No. 14/129,923, filed Dec. 27, 2013.
Notice of Allowance in U.S. Appl. No. 13/378,336, mailed on Jun. 13, 2014.
Office Action in U.S. Appl. No. 13/388,277, mailed on Jul. 3, 2014.
First Chinese Office Action in Application No. 2009801607004, mailed Jun. 25, 2014.

* cited by examiner 20a
26
42
43
24a
32
36
30
34
24b

POWER ELECTRONIC CONVERTER FOR USE IN HIGH VOLTAGE DIRECT CURRENT POWER TRANSMISSION

CROSS REFERENCE TO RELATED APPLICATIONS OR PRIORITY CLAIM

This application is a National Phase of PCT/EP2010/054660, filed Apr. 8, 2010, entitled, "HYBRID HVDC CONVERTER", the contents of which are incorporated herein by reference in their entirety.

This invention relates to a power electronic converter for use in high voltage direct current power transmission and reactive power compensation.

BACKGROUND

In power transmission networks alternating current (AC) power is typically converted to direct current (DC) power for transmission via overhead lines and/or undersea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC to DC power is also utilized in power transmission networks where it is necessary to interconnect the AC networks operating at different frequencies.

In any such power transmission network, converters are required at each interface between AC and DC power to effect the required conversion, and two such forms of converter are the line commutated converter (LCC) and the voltage source converter (VSC).

One form of known converter is based on the arrangement of large thyristors in twelve-pulse line commutated converter (LCC) structures to achieve the conversion between AC and DC power. These converters are capable of continuous operation at 3000 to 4000 Amperes and are suitable for plant installations capable of processing several gigawatts of electrical power.

Power plants based on these conventional converters absorb significant quantities of reactive power from the AC network to which they are connected. In addition, the twelve-pulse nature of the LCC structures leads to high levels of harmonic distortion in converter current. Consequently both of these factors mean that the conventional power plants require the use of large passive inductors and capacitors to provide the required reactive power and filter the harmonic currents. This leads to an increase in size, weight and costs of converter hardware.

In addition, inherent regulation effects arising from an impedance of the associated transformer and AC network leads to a reduction in DC side voltage with an increase in current flow. This is seen as an inherent negative slope in DC voltage against DC current characteristic as the power flow increases.

SUMMARY

According to a first aspect of the invention, there is provided a power electronic converter for use in high voltage direct current power transmission and reactive power compensation comprising at least one converter limb including first and second DC terminals for connection in use to a DC network, the or each converter limb including at least one first converter block and at least one second converter block connected between the first and second DC terminals; the or each first converter block including a plurality of line-commutated thyristors and at least one first AC terminal for connection in use to an AC network, the or each second converter block including at least one auxiliary converter, the or each auxiliary converter being a chain-link converter, the or each chain-link converter including a chain of modules connected in series, each module including two pairs of switching elements connected in parallel with an energy storage device in a full-bridge arrangement to define a 2-quadrant bipolar module that can provide positive or negative voltage and can conduct current in one direction, each pair of switching elements including one self-commutated switching element and one diode connected in series; wherein the self-commutated switching elements are controllable in use such that the or each chain of modules corrected in series provides a continuously variable voltage source to modify a DC voltage presented to the DC side of the converter limb and/or modify an AC voltage and an AC current on the AC side of the converter.

The provision of first and second converter blocks results in a hybrid power electronic converter that incorporates line-commutated thyristors for conversion between AC and DC power, and self-commutated switching elements to provide improved performance in providing reactive power and controlling harmonic currents. This improved performance results from the inherent turn-on and turn-off capability and fast switching characteristics of the self-commutated switching elements, such as insulated gate bipolar transistors. This leads to a reduction in converter size, weight and costs since it is no longer necessary to use large harmonic filters and capacitors to compensate for harmonic currents and reactive power drawn by the line commutated converter.

The or each auxiliary converter may be operated to inject a controlled voltage waveform into the AC side and/or DC side of the power electronic converter. The injected voltage waveform can be used to modify the shape of the AC and/or DC side voltage and current to control the flow of real power and reactive power and thereby improve the performance of the power electronic converter. For example, the voltage waveform may be injected to minimize the DC side voltage droop normally associated with increased current and power flow in line-commutated thyristor-based power conversion.

The structure of the chain-link converter allows the build-up of a combined voltage, which is higher than the voltage provided by an individual module, via the insertion of multiple modules, each providing a voltage, into the chain-link converter. By varying the value of the combined voltage, the chain-link converter may be operated to generate a voltage waveform of variable amplitude and phase angle.

In addition, the structure of the chain-link converter also allows the use of self-commutated switching elements in combination with line-commutated thyristors which typically have much higher voltage ratings. Self-commutated switching elements such as IGBTs typically have low voltage ratings which means that conventional voltage source converters based on such self-commutated switching elements tend to have a lower plant rating than conventional twelve-pulse line-commutated thyristor converters. The capability of the chain-link converter to build up a combined voltage however means that self-commutated switching elements in each module may be associated with voltage levels exceeding the individual voltage rating of each self-commutated switching element and therefore may be used in combination with line-commutated thyristors in a hybrid power electronic converter.

The ability of a 2-quadrant bipolar module to provide positive or negative voltages means that the voltage across the or each chain-link converter may be built up from a combination of modules providing positive or negative voltages. The energy levels in the individual energy storage devices may be maintained therefore at optimal levels by controlling the modules to alternate between positive or negative voltage. The structure of the 2-quadrant bipolar module also allows the power electronic converter to operate in the presence of a reversing DC side voltage to enable reverse power flow while maintaining current flow in only one direction.

When the auxiliary converter is only required to provide positive or negative voltage with unidirectional current, it is possible to simplify the design of the bipolar module by replacing one self-commutated switching element in each pair with a diode.

Preferably the or each energy storage device includes a capacitor, a fuel cell, a battery or an auxiliary AC generator with an associated rectifier.

Such flexibility is useful in the design of converter stations in different locations where the availability of equipment may vary due to locality and transport difficulties. For example, the energy storage device of each module on an offshore wind farm may be provided in the form of an auxiliary AC generator connected to a wind turbine.

Each switching element of the or each module preferably includes a semiconductor device. Such a semiconductor device may be in the form of an insulated gate bipolar transistor, a gate turn-off thyristor, a field effect transistor, or an integrated gate commutated thyristor.

The use of semiconductor devices is advantageous because such devices are small in size and weight and have relatively low power dissipation, which minimizes the need for cooling equipment. It therefore leads to significant reductions in power converter cost, size and weight.

The fast switching capabilities of such semiconductor devices allow the or each chain-link converter to synthesize complex waveforms for injection into the AC side and/or DC side of the power electronic converter. The injection of such complex waveforms can be used, for example, to minimize the levels of harmonic distortion typically associated with line-commutated thyristor-based power electronic converters. Furthermore the inclusion of such semiconductor devices allow the chain-link converters to respond quickly to the development of AC and DC side faults, and thereby improve fault protection of the power electronic converter.

In embodiments of the invention the or each auxiliary converter may be operable to generate a voltage to offset the voltage across a line-commutated thyristor and thereby minimize the voltage across the respective line-commutated thyristor.

This feature is advantageous in that it allows the line-commutated thyristors to switch at near zero voltage and thereby minimize switching losses and electromagnetic interference. Since the use of near zero voltage switching also reduces voltage sharing errors and the rate of change of voltage seen by the line-commutated thyristors, it becomes possible to simplify the design of converter hardware and associated snubber components.

In other embodiments the or each auxiliary converter may be operable to generate a voltage to oppose the flow of current created by a fault, in use, in the AC or DC networks.

The auxiliary converter may be used to inject a voltage to provide the opposing voltage required to extinguish the fault current and thereby prevent damage to the power electronic converter components. The use of the power electronic converter components to carry out both voltage conversion and extinguishment of fault currents simplifies or eliminates the need for separate protective circuit equipment, such as a circuit breaker or isolator. This leads to savings in terms of hardware size, weight and costs.

In further embodiments the or each first converter block may include one or more parallel-connected sets of series-connected line-commutated thyristors. In such embodiments, a mid-point between the series-connected line-commutated thyristors of the or each parallel-connected set defines a first AC terminal for connection in use to a respective phase of an AC network.

Such an arrangement of line-commutated thyristors can be used to carry out rectification and inversion processes in order to transfer electrical power between AC and DC networks.

In embodiments of the invention at least one first converter block may be connected in parallel with a second converter block, the parallel-connected first and second converter blocks forming a single-phase converter element. In such embodiments three single-phase converter elements may be connected in series or parallel on the DC side of the circuit to define a two-terminal DC network for three-phase electrical power transmission.

The parallel connection of first and converter blocks results in a flexible power electronic converter that is capable of conducting current in both directions.

In other embodiments, the first converter block may further include at least one diode. In each of the following embodiments, the line-commutated thyristors of the first converter block may be replaced by diodes.

The use of diodes to replace the line-commutated thyristors results in power electronic converters with asymmetrical power transfer characteristics with limited reverse power flow between AC and DC networks. Such power electronic converters are suitable for applications, such as windfarms, that are heavily biased towards the export of power from an AC network to a DC network and only require minimum input of power. Consequently converter parts that would otherwise be required to facilitate the transfer of power from the DC network to the AC network may be omitted, which results in savings in terms of size, weight and costs.

In embodiments of the invention a first converter block may be connected in series with a second converter block on the DC side of the circuit to define a two-terminal DC network for multi-phase electrical power transmission, the first converter block including a plurality of parallel-connected sets of series-connected line-commutated thyristors, the first AC terminal of each parallel-connected set being connected to a respective phase of the AC network, the second converter block including a plurality of auxiliary converters, each auxiliary converter including a second AC terminal for connection in use to a respective phase of the AC network, wherein the or each parallel-connected set of series-connected line-commutated thyristors and the or each auxiliary converter are operable to modify an AC voltage of the associated phase of the AC network. In such an embodiment, when employing the use of a chain-link converter, a mid-point of each chain-link converter defines a second AC terminal for connection in use to a respective phase of the AC network.

In such embodiments the power electronic converter may be connected in use to the AC network via a transformer such that the first AC terminals of the first converter block is connected in use to secondary windings of the transformer and the second AC terminals of the second converter block is connected in use to tertiary windings of the transformer.

Such a power electronic converter arrangement allows the auxiliary converter to inject a voltage to modify both AC and DC voltages and therefore contribute to the flow of power in both directions. Conventionally line-commutated thyristor based converters draw large amounts of lagging reactive power which causes the magnitude of the AC voltage to drop as the level of transmitted power and DC current increases. Such converters rely on the use of on-line tap changers at primary windings of a transformer to stabilise the associated AC voltage by adjusting the ratio of the transformer so that the converters operate at the optimum level of voltage. The direct connection of auxiliary converters to the respective phases of the AC network allows direct control of the AC voltage magnitude. Consequently there is no requirement for on-line tap changers to stabilise and control the AC voltage because the self-commutated switching elements of each auxiliary converter provide the necessary voltage control. The removal of tap changing equipment leads to an increase in system reliability as well as savings in terms of converter size, weight and costs.

In other embodiments the or each converter limb may include a first converter block connected in series between two second converter blocks to define first and second limb portions, each limb portion including at least one line-commutated thyristor connected in series with a auxiliary converter between a respective one of the first and second DC terminals and the respective first AC terminals, each line-commutated thyristor and each auxiliary converter of each limb portion being operable to switch the respective limb portion in and out of circuit to generate a voltage waveform at the respective AC terminal.

Alternatively the or each converter limb may include two second converter blocks connected in series between the series-connected line-commutated thyristors of the respective first converter block to define first and second limb portions, a mid-point between the two second converter blocks defining the first AC terminal of the or each converter limb, each limb portion including at least one line-commutated thyristor connected in series with an auxiliary converter between a respective one of the first and second DC terminals and the respective first AC terminals, each line-commutated thyristor and each auxiliary converter of each limb portion being operable to switch the respective limb portion in and out of circuit to generate a voltage waveform at the respective AC terminal.

Other than allowing the auxiliary converter to inject a voltage to modify both AC and DC voltages and therefore contribute to the flow of power in both directions, these power electronic converter arrangements provide simpler arrangements due to the reduction in the number of AC terminal connections to the AC network.

In such embodiments the power electronic converter may include multiple converter limbs, the first AC terminal of each converter limb being connected in use to a respective phase of a multi-phase AC network.

In such power electronic converters, the line-commutated thyristors and the auxiliary converter of each converter limb operate independently of that of the other converter limbs and therefore only affect the phase connected to the respective first AC terminal, and has no influence on the phases connected to the first AC terminals of the other converter limbs.

In other such embodiments the power electronic converter may include two converter limbs and further including a pair of DC link capacitors connected in series between the first and second DC terminals of each converter limb and connected in parallel with each converter limb, a mid-point between the DC link capacitors defining a third AC terminal for connection in use to a phase of the AC network.

Synthesising waveforms at the first AC terminals of the two converter limb results in a generation of a third voltage waveform at the third AC terminal between the DC link capacitors. If the two synthesised waveforms have identical shapes and magnitude, the third waveform will share the same waveform shape and magnitude as the synthesised waveforms.

Converter parts such as capacitors and inductors are only required for the first and second converter limbs. In addition, communication links between the power electronic converter and a global controller can be reduced. This reduction of converter parts result in improvements in cost, space envelope and operating efficiency, when compared to conventional three-phase converter arrangements which require converter parts for all three converter limbs.

Preferably at least one thyristor is connected in parallel with a second converter block, the auxiliary converter of the second converter block being operable to provide a commutating voltage to switch the associated line-commutated thyristor to an off state.

The use of self-commutating switching elements to assist the turn-off of the associated line-commutated thyristor provides improved control over the switching processes in the power electronic converter and therefore an increase in efficiency in power conversion.

In embodiments of the invention, the power electronic converter may further include at least one bypass mechanism operably associated with an auxiliary converter wherein the or each bypass mechanism is operable to cause a short circuit through the bypass mechanism and thereby cause the converter current to flow through the short circuit while bypassing the respective auxiliary converter.

Preferably the or each bypass mechanism is operable to cause a short circuit through the bypass mechanism upon detection of a fault in the AC or DC networks or power electronic converter.

In embodiments employing the use of one or more bypass mechanisms, the or each bypass mechanism may be connected in parallel with the respective auxiliary converter.

The or each bypass mechanism preferably includes a switch, the bypass mechanism being operable to activate the respective switch to cause a short circuit through the activated switch. Such a switch may be in the form of a mechanical bypass switch or a semiconductor switch.

The inclusion of a bypass mechanism provides the associated auxiliary converter with additional fault protection in the event that the auxiliary converter is unable to generate the required voltage to oppose and reduce the driving voltage to reduce the fault current or in the event of commutation failure of thyristors within the power electronic converter that would otherwise lead to high voltage being applied directly to the auxiliary converter.

BRIEF DESCRIPTION OF THE DRAWINGS

Preferred embodiments of the invention will now be described, by way of non-limiting examples, with reference to the accompanying drawings in which.

DETAILED DESCRIPTION

Figure 1:
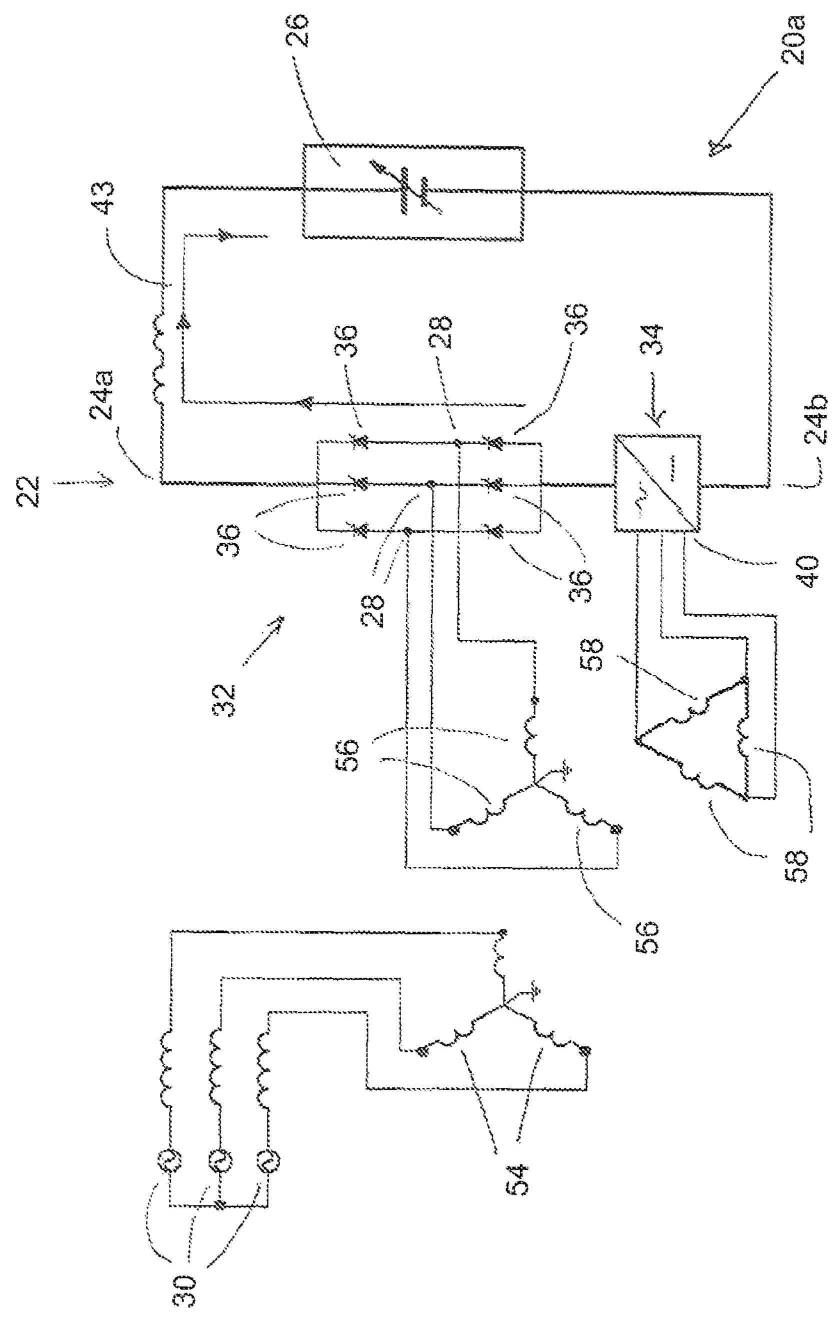
FIG. 1 shows a power electronic converter according to a first embodiment of the invention.

A power electronic converter 20*a* according to a first embodiment of the invention is shown in FIG. 1.

The power electronic converter 20*a* comprises a converter limb 22 including first and second DC terminals 24*a*, 24*b* for connection in use to a DC network 26, and first AC terminals 28 for connection in use to an AC network 30.

The converter limb 22 includes a first converter block 32 and a second converter block 34 connected in series between the first and second DC terminals 24*a*,24*b* to define a two-terminal DC network for exchanging power with a three-phase AC network 30.

The first converter block 32 includes three parallel-connected pairs of line-commutated thyristors 36. A mid-point between each pair of line-commutated thyristors 36 defines a first AC terminal 28 for connection in use to a respective phase of a three-phase AC network 30. The provision of the first AC terminals 28 allows the transfer of electrical power between the AC and DC networks 30, 26.

The second converter block 34 includes three auxiliary converters connected in parallel, each auxiliary converter being a chain-link converter including a chain of modules connected in series. A mid-point of each chain-link converter defines a second AC terminal 40 for connection in use to a respective phase of the AC network 30.

The above configuration of the first and second converter blocks 32,34 means that each phase of the AC network 30 is influenced by the operation of a respective parallel-connected pair of line-commutated thyristors 36 and a respective chain-link converter. The operation of each line-commutated thyristor 36 and each chain-link converter only directly affects the phase to which they are connected.

Figure 2:
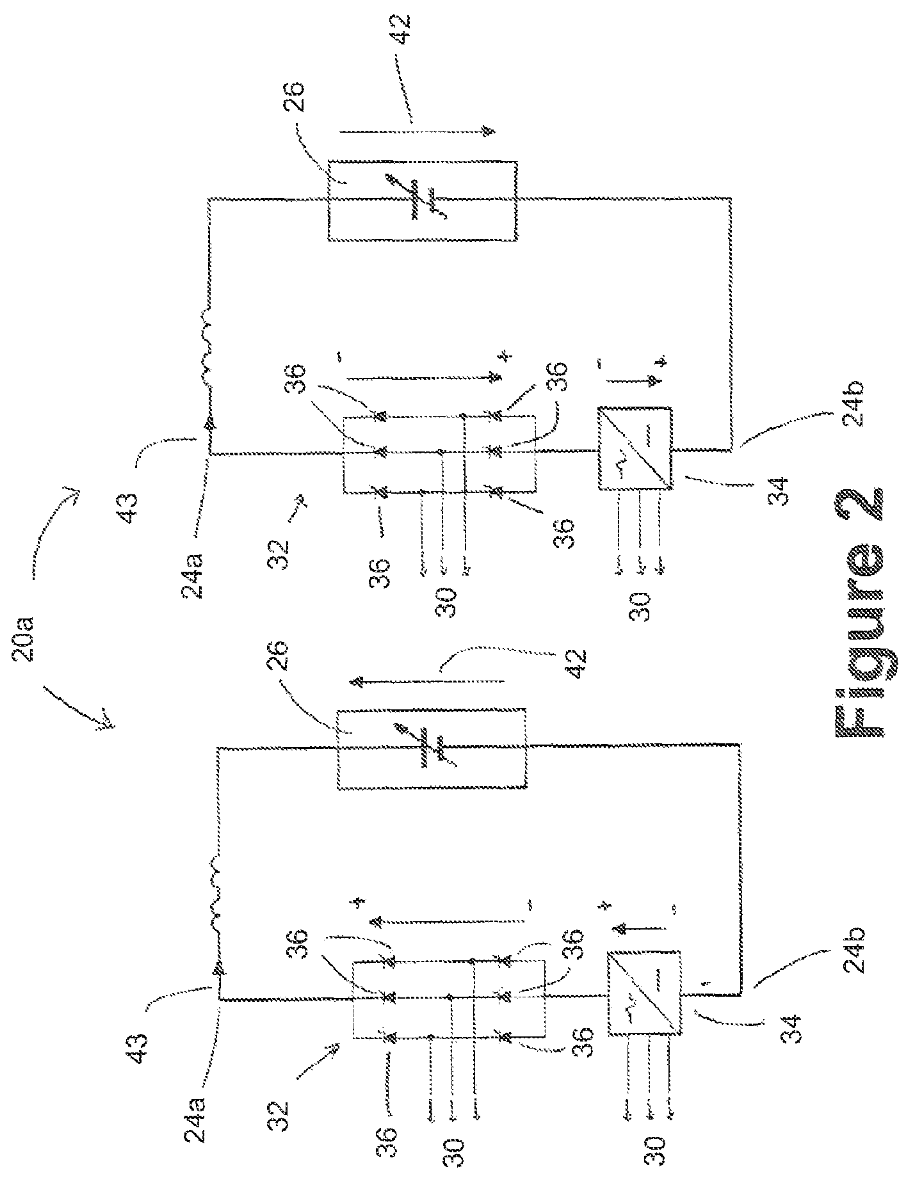
FIG. 2 shows the operation of the power electronic converter of FIG. 1.

FIG. 2 illustrates the operation of the power electronic converter 20*a* in FIG. 1. The power electronic converter 20*a* is controlled to provide symmetrical power transfer between the AC and DC networks 30, 26. The DC network 26 in this example is provided in the form of a remote converter station.

In use, the first and second DC terminals 24*a*,24*b* are connected to a respective one of positive or negative terminals of the remote converter station 26, the positive and negative terminals respectively carrying a voltage of $+V_{DC}/2$ and $-V_{DC}/2$, where $V_{DC}$ is the DC voltage range of the remote converter station 26. This configuration allows the remote converter station 26 to provide a DC voltage 42 of either polarity with respect to the first and second DC terminals 24*a*, 24*b* of the power electronic converter 20*a*.

During the transfer of power from the AC network 30 to the remote converter station 26, the DC voltage 42 across the remote converter station 26 is set at a first polarity. The arrangement of the line-commutated thyristors 36 allows a first converter block 32 to act as a rectifier to convert AC power to DC power while current 43 flows in the DC side of the power electronic converter 20*a* in a first direction.

During the transfer of power from the remote converter station 26 to the AC network 30, the DC voltage 42 across the remote converter station 26 is reversed to a second polarity by controlling the associated firing angles. The arrangement of the line-commutated thyristors 36 allows the first converter block 32 to act as an inverter to convert DC power to AC power while the current 43 in the DC side of the power electronic converter 20*a* continues to flow in the first direction.

The switching operations of the line-commutated thyristors 36 are controlled to effect the rectification and inversion processes during the transfer of power between the AC and DC networks 30, 26.

As seen in FIG. 2 and as described above, during operation of the power electronic converter 20*a*, the second converter block 34 is required to be capable of operating in the presence of a reversing DC voltage and capable of enabling bidirectional power flow with unidirectional current flow.

Figure 3:
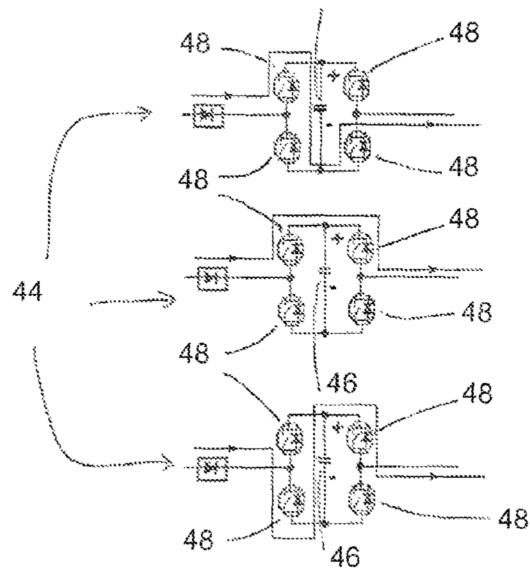
FIG. 3 shows the operation of a 4-quadrant bipolar module not forming part of the invention.

In an arrangement not forming part of the invention each module 44 of each chain-link converter of the second converter block may include two pairs of auxiliary switching elements connected in parallel with a capacitor 46 in a full-bridge arrangement to form a 4-quadrant bipolar module 44, each auxiliary switching element being a self-commutated switching element 48 connected in parallel with an anti-parallel diode, as shown in FIG. 3.

Chain-link converters based on 4-quadrant bipolar modules 44 can be operated in four quadrants by controlling the phase angle and magnitude of the AC side generated waveform and therefore can absorb or generate real and reactive power.

The capacitor 46 of each 4-quadrant bipolar module 44 may be bypassed or inserted into the chain-link converter by changing the state of the auxiliary switching elements.

A capacitor 46 of a module 44 is bypassed when the pairs of self-commutated switching elements 48 are configured to form a short circuit in the module 44, causing the current in the power electronic converter to pass through the short circuit and bypass the capacitor 46. This enables the module 44 to provide a zero voltage.

A capacitor 46 of a module 44 is inserted into the chain-link converter when the pairs of self-commutated switching elements 48 are configured to allow the converter current to flow into and out of the capacitor 46, which is then able to charge or to discharge its stored energy and provide a voltage. The full-bridge arrangement allows the self-commutated switching elements 48 to be configured to insert the capacitor 46 in the chain-link converter in either forward and reverse positions to allow either direction of current flow through the capacitor 46 so as to provide a positive or negative voltage.

In addition, the module 44 can conduct current in both directions when its capacitor 46 is either bypassed or inserted into the respective chain-link converter.

As such, 4-quadrant bipolar modules 44 are capable of operating in the presence of a reversing DC voltage and enabling bidirectional power flow with unidirectional current flow, as shown in FIG. 3.

The provision of 4-quadrant bipolar modules 44 in the or each chain-link converter therefore renders the use of such chain-link converters compatible with line-commutated thyristor-based power conversion.

The self-commutated switching elements 48 are operable so that the chain of modules 44 provides a stepped variable voltage source, and are switched at near to the fundamental frequency of the AC network.

It is possible to build up a combined voltage across the chain-link converter which is higher than the voltage available from each of the individual modules 44 via the insertion of the capacitors 46 of multiple modules 44, each providing its own voltage, into the chain-link converter. This enables the use of self-commutated switching elements 48 in combination with line-commutated thyristors which typically have much higher voltage ratings. Self-commutated switching elements 48 such as IGBTs typically have low voltage ratings which means that conventional power electronic converters based on such self-commutated switching elements 48 tend to have a lower plant rating than conventional twelve-pulse line-commutated thyristor converters. The capability of the chain-link converter to build up a combined voltage however means that self-commutated switching elements 48 in each module 44 may be associated with voltage levels exceeding the individual voltage rating of each self-commutated switching element 48 and therefore may be used in combination with line-commutated thyristors with higher voltage ratings.

In addition, the ability of a 4-quadrant bipolar module 44 to provide positive or negative voltages means that the voltage across each chain-link converter may be built up from a combination of modules 44 providing positive or negative voltages. The energy levels in the individual capacitors 46 may be maintained therefore at optimal levels by controlling the modules 44 to alternate between providing positive or negative voltage.

Figure 4:
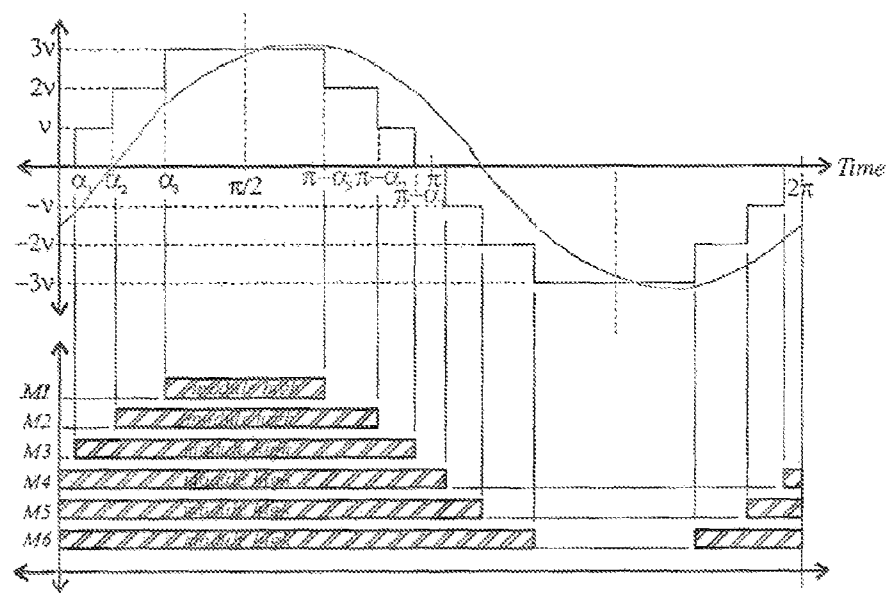
FIG. 4 shows the step-wise generation of a 50 Hz sinusoidal voltage waveform.

It is also possible to vary the timing of switching operations for each module 44 such that the insertion and/or bypass of the capacitors 46 of individual modules 44 in the chain-link converter results in the generation of a voltage waveform. An example of a voltage waveform generated using the chain-link converter is shown in FIG. 4, in which the insertion of the capacitors of the individual modules is staggered to generate a 50 Hz sinusoidal waveform. Other waveform shapes may be generated by adjusting the timing of switching operations for each module 44 in the chain-link converter.

In the arrangement shown in FIG. 3, each self-commutated switching element 48 includes an insulated gate bipolar transistor accompanied by a reverse-parallel connected diode.

It is envisaged that in other embodiments each self-commutated switching element 48 may include a different semiconductor device, such as a field effect transistor, gate-turn-off thyristor, integrated gate-commutated transistor, or other self commutated semiconductor switches, accompanied by a reverse-parallel connected diode.

The fast switching capabilities of self-commutated switching elements 48 allow a resulting chain-link converter to synthesize complex waveforms for injection into the power electronic converter, and thereby provide excellent control and flexibility over the generated converter voltage and current waveforms. The synthesis and injection of complex waveforms can be used to minimise harmonic distortion which are typically present in line-commutated thyristor-based power conversion.

It is also envisaged that in other embodiments, the capacitor 46 of each of the modules 44 may be replaced by a different energy storage device such as a fuel cell, a battery or an auxiliary AC generator with an associated rectifier.

Figure 5:
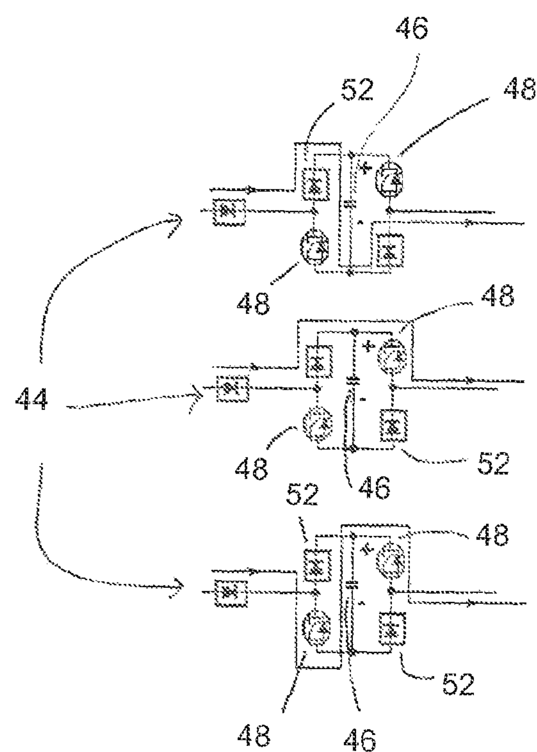
FIG. 5 shows the operation of a simplified 2-quadrant bipolar module.

In a preferred embodiment of the invention, the 4-quadrant bipolar module 44 may be simplified so that each module 44 includes two pairs of auxiliary switching elements, each pair of auxiliary switching elements consisting of one self-commutated switching element 48 and one diode 52 connected in series, as shown in FIG. 5. The replacement of a self-commutated switching element 48 with a diode 52 in each pair of auxiliary switching elements leads to a reduction in converter size, weight and cost.

The simplified 4-quadrant bipolar module 44, i.e. the resulting 2-quadrant bipolar module 44, can provide positive, zero and negative voltage while maintaining unidirectional current flow.

A capacitor 46 of the simplified 4-quadrant bipolar module 44 is bypassed when a self-commutated switching element 48 and a diode 52 is configured to form a short circuit in the module 44, causing the current in the power electronic converter to pass through the short circuit and bypass the capacitor 46. This enables the module 44 to provide a zero voltage.

The simplified 4-quadrant bipolar module 44 provides a positive voltage when the self-commutated switching elements 48 are opened to allow the converter current to flow in one direction through the capacitor 46 via the diodes 52, and provides a negative voltage when the self-commutated switching elements 48 are closed to allow the converter current to flow in the other direction through the capacitor 46 via the self-commutated switching elements 48.

Chain-link converters based on this simplified 4-quadrant bipolar module 44 are therefore capable of providing bidirectional power flow with unidirectional current flow and are therefore compatible with line-commutated thyristor-based power conversion.

Figure 6:
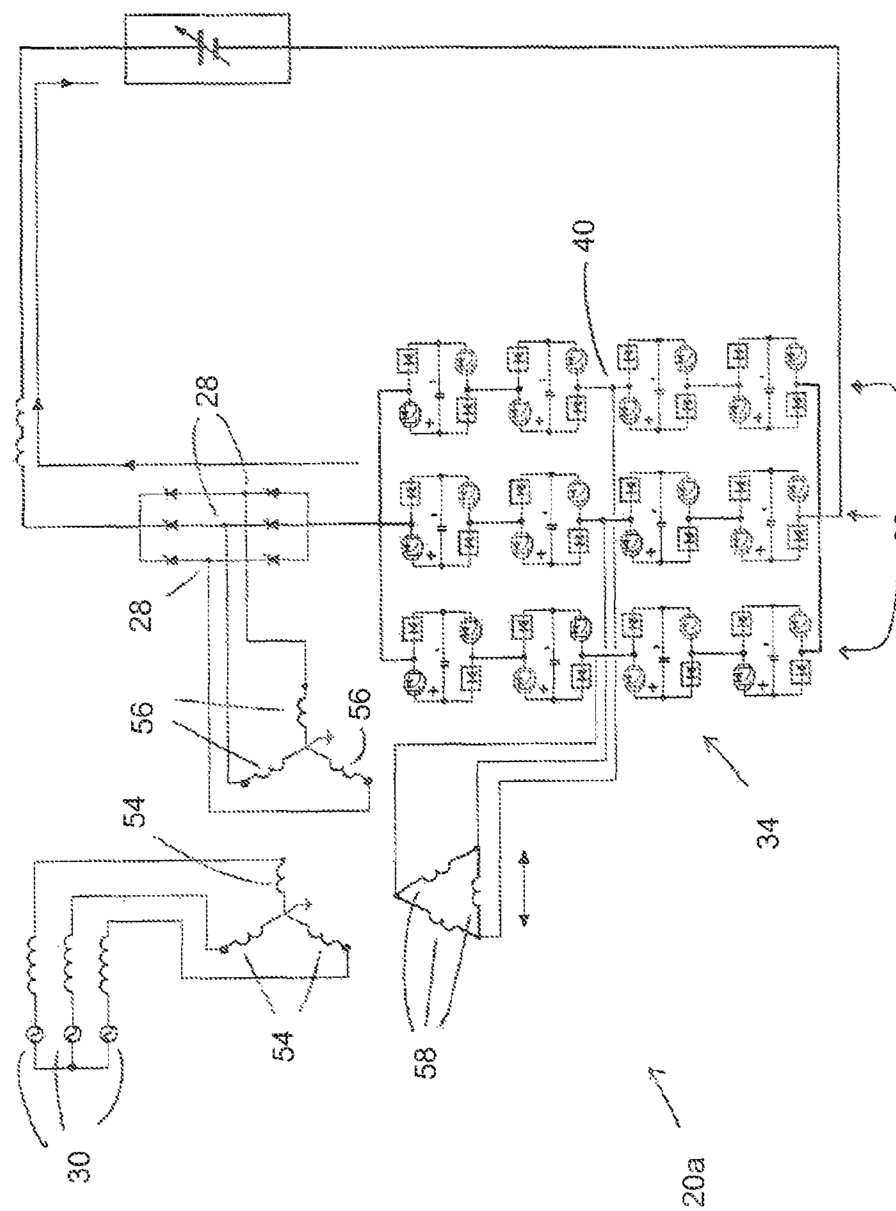
FIG. 6 shows the use of 2-quadrant bipolar module shown in FIG. 5 in the power electronic converter of FIG. 1.

FIG. 6 shows the use of chain-link converters 38 which include 2-quadrant bipolar modules in the power electronic converter of FIG. 1.

In use, as shown in FIGS. 1 and 6, the power electronic converter 20*a* may be connected to an AC network 30 via a transformer. Primary windings 54 of the transformer are directly connected to the AC network 30 while secondary and tertiary windings 56,58 of the transformer are respectively connected to the first and second AC terminals 28,40 of the power electronic converter 20*a*. The primary windings 54 are mutually coupled with the secondary and tertiary windings 56,58 so that the first and second AC terminals 28,40 are connected in use to a respective phase of the AC network 30.

Such an arrangement allows each chain-link converter 38 of the second converter block 34 to directly control the magnitude of the AC voltage of the respective phase of the AC network 30. Consequently there is no requirement for on-line tap changers to be incorporated into the associated transformer to stabilise and control the AC voltage because the self-commutated switching elements 48 of each chain-link converter 38 provide the necessary voltage control. The removal of tap changing equipment leads to an increase in system reliability as well as savings in terms of converter size, weight and costs.

Figure 7:
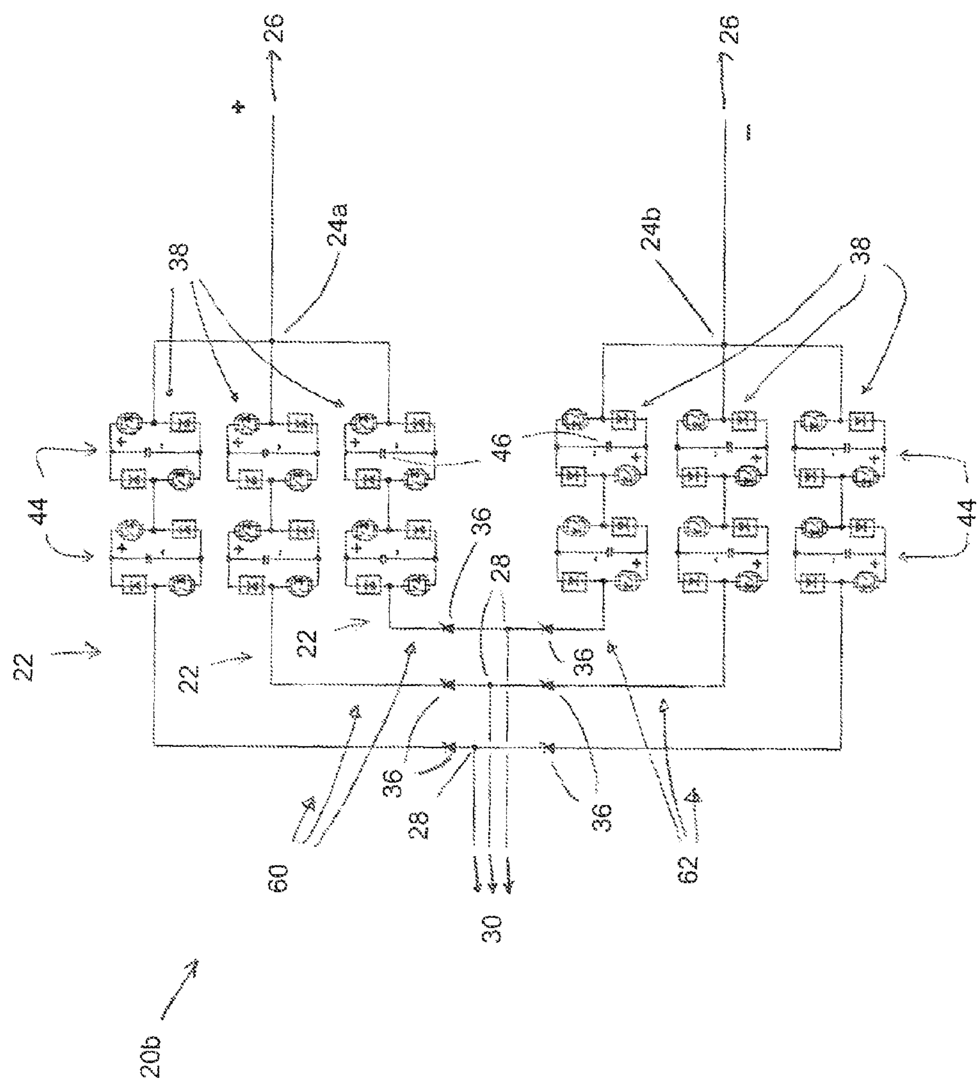
FIG. 7 shows a power electronic converter according to a second embodiment of the invention.

A power electronic converter 20*b* according to a second embodiment of the invention is shown in FIG. 7.

The power electronic converter 20*b* comprises three converter limbs 22 including first and second DC terminals 24*a*, 24*b* for connection in use to a DC network 26, and first AC terminals 28 for connection in use to an AC network 30.

In use, the first and second DC terminals 24*a*,24*b* are connected to a respective one of positive or negative terminals of the DC network 26, the positive and negative terminals respectively carrying a voltage of $+V_{DC}/2$ and $-V_{DC}/2$, where $V_{DC}$ is the DC voltage range of the DC network 26. This configuration allows the DC network 26 to provide a DC voltage of either polarity with respect to the first and second DC terminals 24*a*,24*b* of the power electronic converter 20*b* to enable bidirectional power flow between the AC and DC networks 30,26.

Each converter limb 22 includes a first converter block connected in series between two second converter blocks to define first and second limb portions 60,62, each limb portion 60,62 including a line-commutated thyristor 36 connected in series with a chain-link converter 38 between a respective one of the first and second DC terminals 24*a*,24*b* and the respective first AC terminals 28, each line-commutated thyristor 36 and each chain-link converter 38 of each limb portion 60,62 being operable to switch the respective limb portion 60,62 in and out of circuit to generate a voltage waveform at the respective first AC terminal 28.

The series connection between the line-commutated thyristor 36 and the chain-link converter 38 of each of the first and second limb portions 60,62 means that, in other embodiments, they may be connected in a reverse order between the first AC terminal 28 and the respective DC terminal 24*a*,24*b*.

In other embodiments, each converter limb may therefore include two second converter blocks connected in series between the series-connected line-commutated thyristors of the respective first converter block to define first and second limb portions, a mid-point between the two second converter blocks defining the first AC terminal of the or each converter limb, each limb portion including a line-commutated thyristor connected in series with an chain-link converter between a respective one of the first and second DC terminals and the respective first AC terminals, each line-commutated thyristor and each chain-link converter of each limb portion being operable to switch the respective limb portion in and out of circuit to generate a voltage waveform at the respective first AC terminal.

It is envisaged that in other embodiments each limb portion 60,62 may include a string of line-commutated thyristors connected in series with the chain-link converter 38 between a respective one of the first and second DC terminals 24*a*,24*b* and the respective first AC terminals 28.

In the arrangement shown in FIG. 7, the line-commutated thyristors 36 and the chain-link converter 38 of each converter limb 22 operate independently of that of the other converter limbs 22 and therefore only directly affects the phase connected to the respective first AC terminal 28, and has limited influence on the phases connected to the first AC terminals 28 of the other converter limbs 22.

This power electronic converter assembly 20*b* provides a much simpler arrangement due to the reduction in the number of AC terminal connections to the AC network 30 while performing similar functions to the power electronic converter 20*a* shown in FIG. 1. In addition, the structure of the transformer interconnecting the AC network 30 and the power electronic converter 20*b* can be simplified by omitting the set of tertiary windings 58 shown in FIGS. 1 and 6.

As described above, the line-commutated thyristors 36 are controllable to perform rectification and inversion processes by switching the first and second limb portion 60,62 into and out of circuit to generate a voltage waveform at the respective first AC terminal 28.

The switching operations in the chain-link modules 44 may be configured so that the insertion and bypass of the capacitors 46 are coordinated with the switching of the line-commutated thyristors 36 to form a step-wise approximation of, for example, a sinusoidal waveform at the respective first AC terminals 28. To generate positive or negative components of a sinusoidal waveform, the output voltage may be formed by increasing or decreasing the number of inserted capacitors 46 in the chain-link converter 38 and thereby changing the chain-link converter voltage. The change in the chain-link converter voltage can be observed in the step-wise increments or decrements of the output voltage at the first AC terminal 28. The step-wise approximation of the voltage waveform may be improved by using a higher number of modules 44 with lower voltage levels to increase the number of voltage steps.

Each chain-link converter 38 is preferably operable to generate a voltage to offset the voltage across a line-commutated thyristor 36 and thereby minimize the voltage across the respective line-commutated thyristor 36. Offsetting the voltage across the line-commutated thyristor 36 may also minimize switching losses during the commutation of the line-commutated thyristor 36 between on and off states or to reduce voltage stress across the line-commutated thyristor 36 when it is in an off state.

At the point of commutation of line-commutated thyristors 36 in both limb portions 60,62 between on and off states, the associated chain-link converter 38 in the respective limb portion 60,62 may be operated to generate a voltage such that the full voltage range of the DC network 26, $V_{DC}$, is opposed by the voltage provided by the chain-link converters 38 in both limb portions 60,62. As a result, there is zero or minimal voltage across the line-commutated thyristors 36 of the first and second limb portions 60,62 when the line-commutated thyristors 36 switch from one state to the other. Switching at near-zero voltage minimizes losses associated with the commutation of the line-commutated thyristors 36.

This feature is advantageous in that it allows the line-commutated thyristors 36 to switch at near zero voltage and thereby minimize switching losses and electromagnetic interference. Since the use of near zero voltage switching also reduces voltage sharing errors and the rate of change of voltage seen by the line-commutated thyristors 36, it becomes possible to simplify the design of converter hardware and associated snubber components.

When a line-commutated thyristor 36 of a limb portion 60,62 is in an off state, the limb portion 60,62 supports a voltage equal to the difference between the output voltage at the respective first AC terminal 28 and the DC voltage at the respective DC terminal 24. The chain-link converter 38 may be configured to generate a voltage that opposes the voltage across the limb portion 60,62 to minimize the voltage stress across the line-commutated thyristor 36 in the off state. This is because the voltage capability of each limb portion 60,62 is a combination of the voltage capability of the respective chain-link converter 38 and the voltage rating of the respective line-commutated thyristor 36 and can be distributed in a non-symmetrical manner if desired.

It is envisaged that such use of chain-link converters 38 in offsetting the voltage across line-commutated thyristors 36 to minimize switching losses and voltage stress across the line-commutated thyristors 36 are also applicable to other embodiments of the hybrid power electronic converter.

It is envisaged that in other embodiments of the invention, the power electronic converter may include multiple converter limbs, the first AC terminal of each converter limb being connected in use to a respective phase of a multi-phase AC network, or a single converter limb including a first AC terminal for connection in use to a single-phase AC network.

Figure 8:
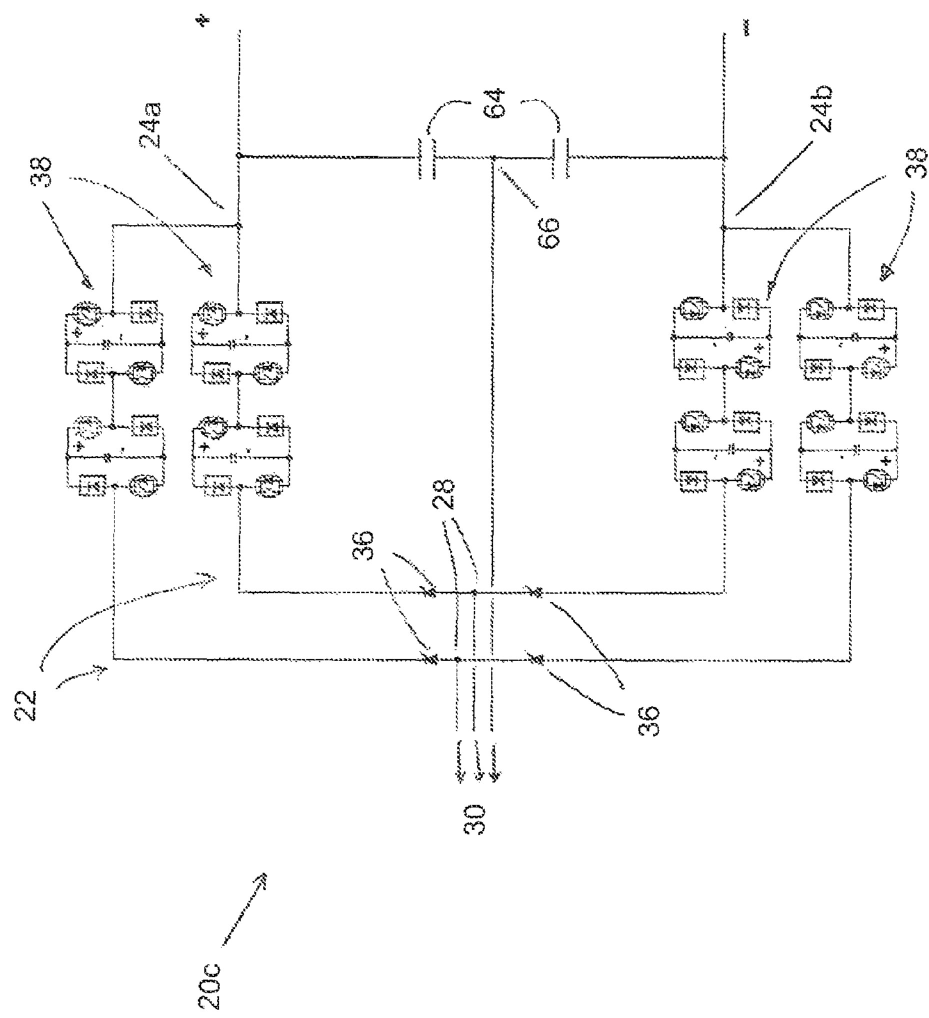
FIG. 8 shows a power electronic converter according to a third embodiment of the invention.

Alternatively the power electronic converter 20*c* may include two converter limbs 22 and further include a pair of DC link capacitors 64 connected in series between the first and second DC terminals 24*a*,24*b* of each converter limb 22 and connected in parallel with each converter limb 22, a mid-point between the DC link capacitors 64 defining a third AC terminal 66 for connection in use to a phase of the AC network 30, as shown in FIG. 8.

Synthesising waveforms at the first AC terminals 28 of the two converter limbs 22 results in a generation of a third voltage waveform at the third AC terminal 66 between the DC link capacitors 64. If the two synthesised waveforms have identical shapes and magnitude, the third waveform will share the same waveform shape and magnitude as the synthesised waveforms.

In circumstances where the waveforms synthesized at the first AC terminals 28 of the two converter limbs 22 are identical in shape and magnitude, the waveform generated at the third AC terminal 66 will share the same waveform shape and magnitude.

In circumstances where the power electronic converter is to be used to provide or draw balanced real power and reactive power from the three phases of an AC network 30, the shapes of the synthesized waveforms are preferably sinusoidal to match the conventional waveform shape of three-phase AC power supply.

In a conventional three-phase power electronic converter, the switches in each converter limb 22 are operated at a phase angle displacement of 120 electrical degrees to ensure constant power supply over each cycle.

The line-commutated thyristors 36 and the chain-link converters 38 of the two converter limbs 22 may be operated at a phase angle displacement between the phases of the synthesized waveforms, the phase angle displacement being preferably 60 electrical degrees.

The operation of the power electronic converter 20*c* may be explained with reference to the vector diagrams shown in FIGS. 9*a* and 9*b*, which assume that the third AC terminal 66 is connected to ground (zero volts).

The power electronic converter 20*c* is operated at a phase angle displacement of 60 electrical degrees between the synthesized waveforms at the first AC terminals 28 of the two converter limbs 22. The angle between the vectors shown in FIGS. 9*a* and 9*b* is equal to the phase angle displacement between the synthesized waveforms.

Figures 9A, 9B:
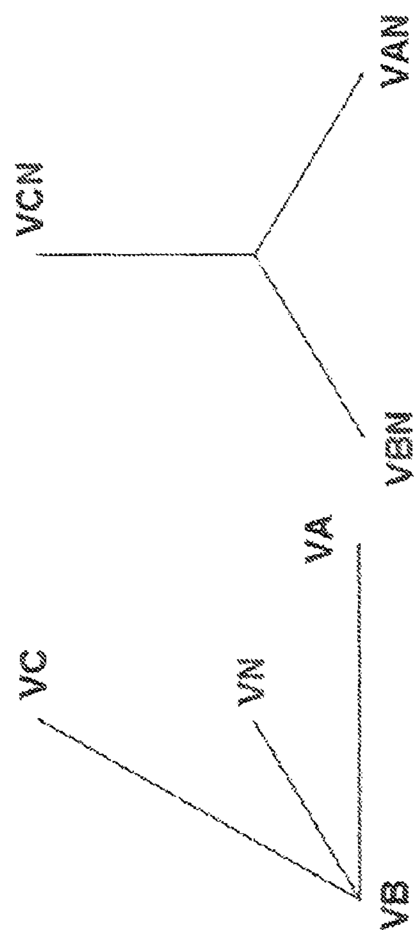
FIGS. 9*a*, 9*b* show vector diagrams of the basic operation of the power electronic converter of FIG. 8.

Referring to FIG. 9*a*, the voltage VA at the first AC terminal 28 of one of the two converter limbs 22 is equal to one unit voltage with respect to the zero voltage at the third AC terminal 66.

The voltage VB at the first AC terminal 28 of the other of the two converter limbs 22 is also equal to one unit voltage with respect of the zero voltage at the third AC terminal 66, at 60 degrees with respect to the vector connecting VA and VB.

A neutral voltage VN is calculated by averaging the three voltages at the first AC terminals 28 of the two converter limbs 22 and the third AC terminal 66. VN is therefore equal to 0.577 unit voltage at 30 degrees with respect to the vector connecting VA and VB and the vector connecting VC and VB.

Referring to FIG. 9*b*, the neutral AC side voltages VAN, VBN and VCN at each AC terminal, with respect to the neutral voltage VN, is equal to 0.577 unit voltage. The angle displacement between any two vectors is equal to 120 degrees, which follows the phase angle displacement between waveforms in a conventional three-phase power electronic converter.

The power electronic converter 20*c* therefore operates as a three-phase power electronic converter 20*c* by utilizing neutral AC side voltages VAN, VBN and VCN.

It is envisaged that the line-commutated thyristors 36 and the chain-link converters 38 of the two converter limbs 22 may be controlled to operate at 60 electrical degrees or other phase angle displacement, and to independently produce sinusoidal or other shaped waveforms allows differing amounts of real and reactive power to be drawn from the three phases of an AC network 30 connected to the AC side of the power electronic converter 20*c*.

Converter parts such as capacitors and inductors are only required for the two converter limbs 22. In addition, communication links between the power electronic converter 20*c* and a global controller can be reduced. This reduction of converter parts result in improvements in cost, space envelope and operating efficiency, when compared to conventional three-phase converter arrangements which require converter parts for all three converter limbs.

Figure 10:
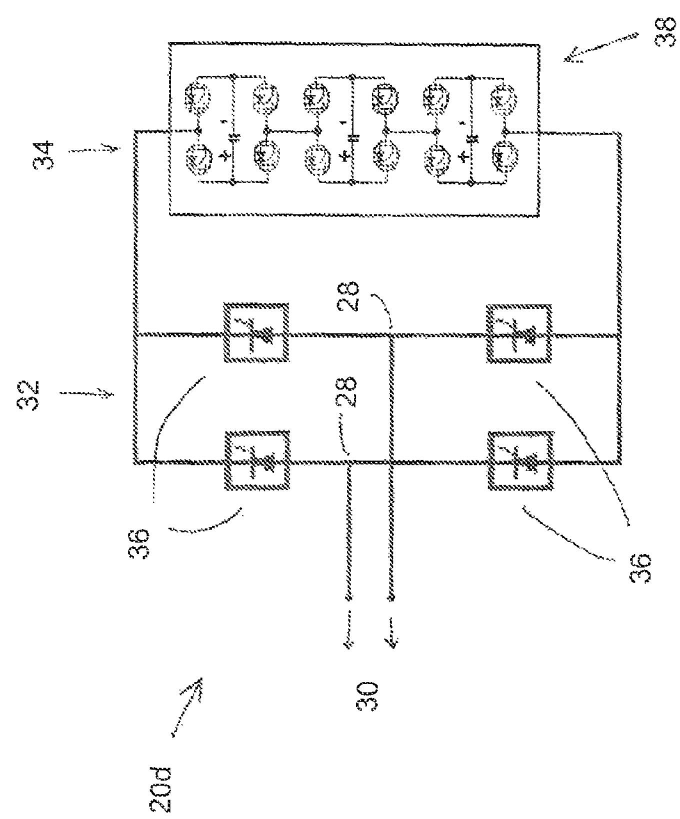
FIG. 10 shows another power electronic converter not forming part of the invention.

In FIG. 10, a first converter block 32 is connected in parallel with a second converter block 34 to form a single-phase converter element. The first converter block 32 consists of two parallel-connected pairs of series-connected line-commutated thyristors 36, a midpoint between each parallel-connected pair of series-connected line-commutated thyristors 36 defining a first AC terminal 28 connected in use to a phase of an AC network 30. The second converter block 34 includes a chain-link converter 38 that, in use, modifies a voltage presented to the DC side of the single-phase converter element to synthesize a waveform closely approximating an offset rectified sinusoid waveform. This results in the generation of a near-perfect sine wave, with minimal harmonic distortion, on the AC side of the single-phase converter element.

The power electronic converter 20*d* shown in FIG. 10 does not therefore require harmonic filters on the AC side of the single-phase converter element to control power quality. In the absence of the chain-link converter 38, the single-phase converter element would draw a current from the AC network 30 containing large order harmonics such as $3^{rd}$, $5^{th}$, $7^{th}$ and $9^{th}$ harmonics, which would result in undesirable harmonic distortion in the voltage waveform at the first AC terminal 28.

The generation of a near-perfect sine wave at the first AC terminal 28 allows the line-commutated thyristors 36 to commutate at near-zero voltage and therefore minimize switching losses in normal operation of the power electronic converter 20*d*. It is envisaged that in other embodiments the chain-link converter 38 may be controlled to synthesize other waveforms depending on the desired functionality of the power electronic converter 20*d*.

The use of the chain-link converter 38 in the second converter block 34 means that the voltage profile presented to the line-commutated thyristors 36 is imposed and controlled by the chain-link converter 38, and is a slowly changing waveform rather than the high voltage steps that would otherwise be presented to the thyristor. It therefore removes the need for large and matched voltage sharing components within the main thyristor converter design and instead results in simpler and less expensive and more efficient hardware.

Three single-phase converter elements may be connected in series or parallel on the DC side of the circuit to define a two-terminal DC network for three-phase electrical power transmission. The structure and function of each of the single phase converter elements of the three-phase converter is the same as that of the single-phase converter element shown in FIG. 10.

Each of the chain-link converters operate independently and 120 electrical degrees apart from each other. In use, the DC output voltage is the sum of the individual synthesized waveforms operating 120 electrical degrees apart.

Figure 11:
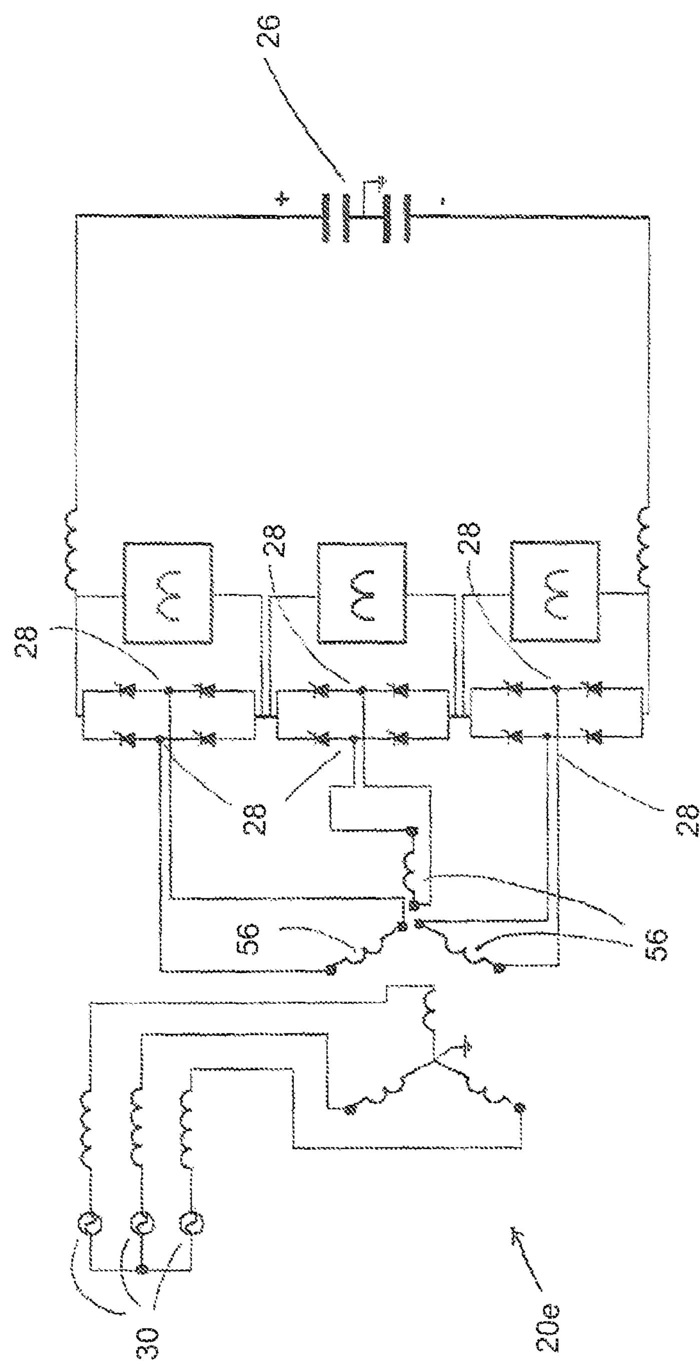
FIG. 11 shows a power electronic converter not forming part of the invention.

The respective first AC terminals 28 of each single-phase converter element may be connected to a respective secondary winding 56 of a three-phase transformer, the secondary windings 56 defining a three-phase star winding, as shown in FIG. 11.

This provision of such an arrangement results in a flexible power electronic converter 20*e* that not only provides bidirectional power flow between the AC and DC networks 30,26, but also allows the current in the power electronic converter 20*e* to flow in both directions instead of a single direction. This power electronic converter arrangement is compatible with the use of chain-link converters including 4-quadrant bipolar modules which are capable of providing positive, zero or negative voltage, and can conduct current in both directions.

In embodiments of the invention, the or each chain-link converter may be operated to generate a DC side voltage to compensate for AC side regulation effects which otherwise would result in a DC side voltage droop normally caused by increased power flow and current in the power electronic converter.

Figure 12:
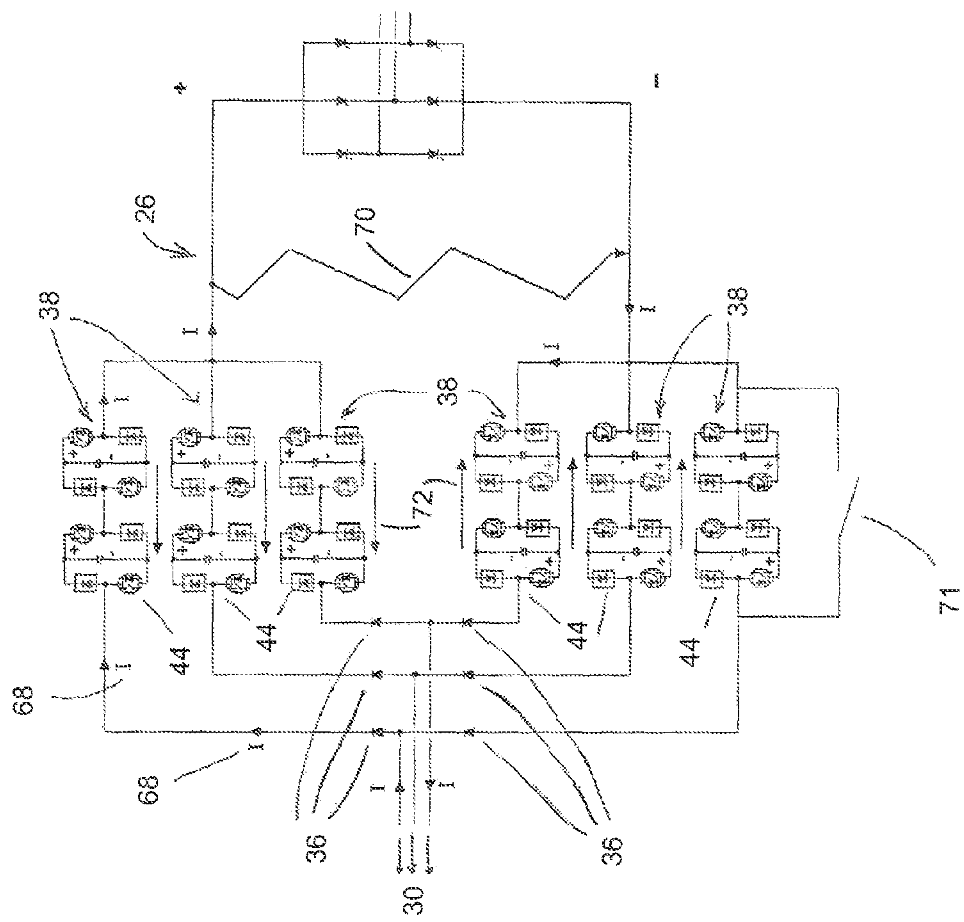
FIG. 12 shows the operation of a power electronic converter to minimise power electronic converter current during a fault in the DC network.

Preferably the or each chain-link converter 38 is operable to generate a voltage to oppose the flow of current 68 created by a fault 70, in use, in the AC or DC networks 30,26, as shown in FIG. 12. The modules 44 of each chain-link converter 38 may be switched into circuit to inject the opposing voltage 72 into the power electronic converter to extinguish the fault current 68 and thereby prevent damage to the power electronic converter components. The fault may be caused by commutation failure of one or more thyristor valves in another converter station, which results in conducting thyristors being connected directly across the DC network 26 to form a short circuit path.

In the event of a fault in the DC network 26 resulting in high fault current 68 in the power electronic converter, the auxiliary switching elements of each module 44 of one or more chain-link converters 38 may be operated to insert the full-bridge modules 44 to inject a voltage 72 which opposes the driving voltage of the non-faulty AC network 30 and thereby reduces the fault current 68 in the power electronic converter.

For example, as shown in FIG. 12, a short circuit 70 occurring across the DC network 26 results in both voltages at the positive and negative terminals of the DC network 26 dropping to zero volts. When this happens, a high fault current 68 can flow from the AC network 30 through the first limb portion 60 of a converter limb 22, and return to the AC network 30 through the short circuit 70 and the second limb portion 62 of another converter limb.

The low impedance of the short circuit means that the fault current 68 flowing in the power electronic converter may exceed the current rating of the power electronic converter.

The fault current 68 may be minimized by opposing the driving voltage from the AC network 30. This is carried out by configuring the auxiliary switching elements of each chain-link module 44 such that the modules 44 are inserted into the respective chain-link converter 38 to provide a voltage which opposes and thereby reduces the driving voltage.

The use of the power electronic converter components to carry out both voltage conversion and extinguishment of fault currents 68 simplifies or eliminates the need for separate protective circuit equipment, such as a circuit breaker or isolator. This leads to savings in terms of hardware size, weight and costs. In addition, the fast switching capabilities of self-commutated switching elements allow the chain-link converter 38 to respond quickly to the development of faults in the AC or DC networks 30,26 and provide the opposing voltage 72 to extinguish the fault current 68.

Preferably the power electronic converter further includes at least one bypass mechanism operably associated with an auxiliary converter.

The inclusion of a bypass mechanism provides the associated auxiliary converter with additional fault protection in the event that the auxiliary converter is unable to generate the required voltage to oppose and reduce the driving voltage to reduce the fault current or in the event of commutation failure of thyristors 36 within the power electronic converter that would otherwise lead to high voltage being applied directly to the auxiliary converter.

The power electronic converter shown in FIG. 12 includes a bypass mechanism connected in parallel with one of its chain-link converters 38. In use, the bypass mechanism is operable to cause a short circuit through the bypass mechanism. The short circuit forms an alternative path for the flow of converter current and thereby causes the converter current to bypass the chain-link converter 68.

The provision of an alternative path for the converter current protects the chain-link converter from high fault current or high voltage, which may cause damage to the chain-link converter.

The short circuit is formed by activating a switch 71 in the bypass mechanism to cause the short circuit through the activated switch 71. Activation of the switch 71 may be done manually by an operator or automatically upon detection of a fault in the AC or DC networks 30,26 or the power electronic converter.

The switch 71 of the bypass mechanism is preferably in the form of a mechanical bypass switch or a semiconductor switch.

It is envisaged that in embodiments employing multiple auxiliary converters, the power electronic converter may include a plurality of bypass mechanisms, each bypass mechanism being operably associated with a respective one of the auxiliary converters.

Figure 13:
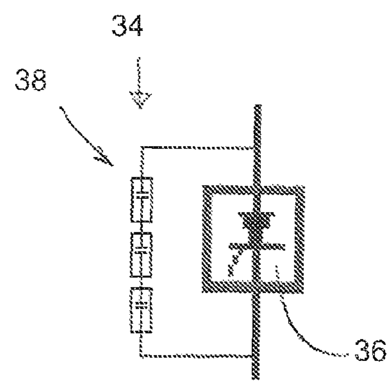
FIG. 13 shows a line-commutated thyristor connected in parallel with a chain-link converter.

Preferably at least one line-commutated thyristor 36 is connected in parallel with a second converter block 34 including a chain-link converter 38, as shown in FIG. 13. The chain-link converter 38 of the second converter block 34 is operable to provide a commutating voltage to switch the associated line-commutated thyristor 36 to an off state. The use of self-commutated switching elements to assist the turn-off of the associated line-commutated thyristor 36 provides improved control over the switching processes and therefore an improvement in performance and efficiency.

Figure 14:
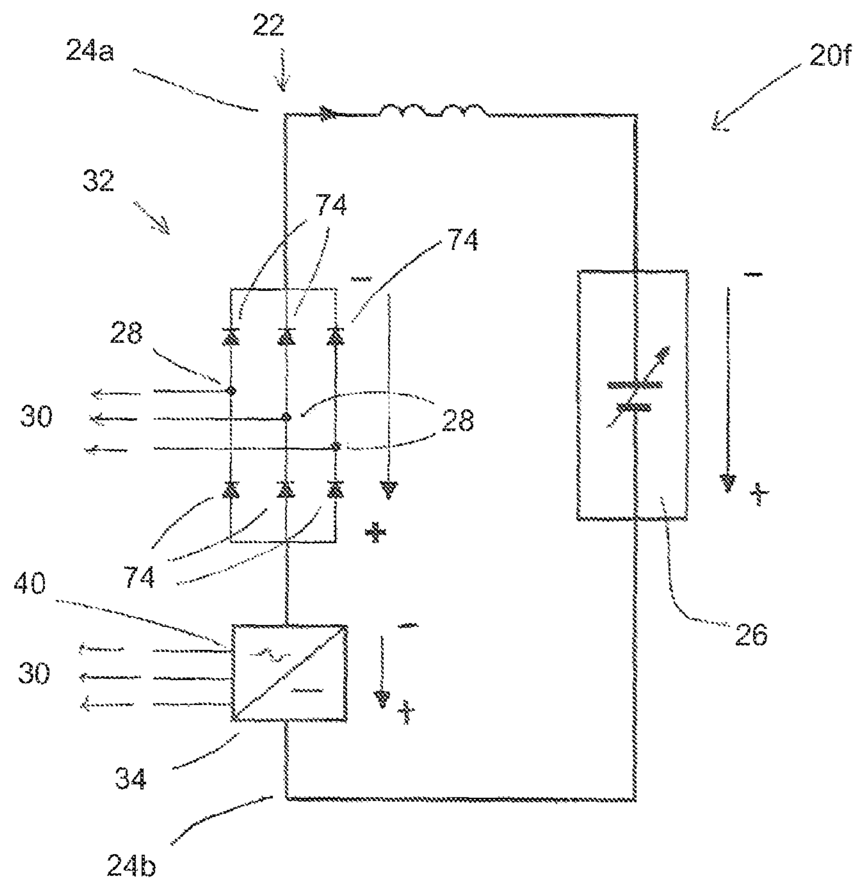
FIG. 14 shows a still further power electronic converter not forming part of the invention.

It is envisaged that the first converter block may further include at least one diode, or the line-commutated thyristors of the first converter block may be replaced by diodes so as to form a power electronic converter including at least one first converter block including a plurality of diodes or a combination of line-commutated thyristors and diodes. FIG. 14 shows a power electronic converter 20*f* which is similar to the power electronic converter 20*a* shown in FIG. 1 except that all the line-commutated thyristors are replaced by diodes 74. The substitution of the line-commutated thyristors in the first converter block 32 with diodes 74 results in a power electronic converter 20*f* with asymmetrical transfer characteristics.

In FIG. 14, the power electronic converter 20*f* comprises a converter limb 22 including first and second DC terminals 24*a*,24*b* for connection in use to a DC network 26, and first AC terminals 28 for connection in use to an AC network 30.

The converter limb 22 includes a first converter block 32 and a second converter block 34 connected in series between the first and second DC terminals 24*a*,24*b* to define a two-terminal DC network for three-phase electrical power transmission.

The first converter block 32 includes three parallel-connected pairs of diodes 74. A mid-point between each pair of diodes 74 defines a first AC terminal 28 for connection in use to a respective phase of a three-phase AC network 30.

The second converter block 34 includes three auxiliary converters connected in parallel, each auxiliary converter being a chain-link converter including a chain of modules connected in series. A mid-point of each chain-link converter defines a second AC terminal 40 for connection in use to a respective phase of the AC network 30.

During the transfer of power from the AC network 30 to the DC network 26, the first converter block 32 behaves as a rectifier to effect the conversion of AC power to DC power. The first converter block 32 however cannot act as an inverter to transfer power from the DC network 26 to the AC network 30. When the polarity of the DC network 26 is reversed such that both diodes 74 in each pair of series-connected diodes 74 are forward-biased, a short-circuit is formed across the first converter block 32. Consequently there is no voltage across the first converter block 32 and no power flow to the AC network 30 from the first converter block 32.

The second converter block 34 provides limited power flow from the DC network 26 to the AC network 30 as a result of the ability of the 4-quadrant bipolar modules 44 of the second converter block 34 to provide bidirectional power flow.

Such power electronic converters **20*f* are suitable for applications, such as windfarms, that are heavily biased towards the export of power from an AC network 30 to a DC network 26 and only require minimum input of power. Consequently converter parts that would otherwise be required to facilitate the transfer of power from the DC network 26 to the AC network 30** may be omitted, which results in savings in terms of size, weight and costs.

It is envisaged that in other embodiments, the power electronic converter **20*f* may include multiple converter limbs 22, each converter limb 22 including at least one first AC terminal 28 for connection in use to a respective phase of a multiphase AC network 30**.

The invention claimed is:

1. A power electronic converter for use in high voltage direct current power transmission and reactive power compensation comprising at least one converter limb including first and second DC terminals for connection in use to a DC network, the or each converter limb including at least one first converter block and at least one second converter block connected between the first and second DC terminals; the or each first converter block including a plurality of line-commutated thyristors and at least one first AC terminal for connection in use to an AC network, the or each second converter block including at least one auxiliary converter, the or each auxiliary converter being a chain-link converter, the or each chain-link converter including a chain of modules connected in series, each module including two pairs of switching elements connected in parallel with an energy storage device in a full-bridge arrangement to define a 2-quadrant bipolar module that can provide positive or negative voltage and can conduct current in one direction, each pair of switching elements including one self-commutated switching element and one diode connected in series, wherein the self-commutated switching elements are controllable in use such that the or each chain of modules connected in series provides a continuously variable voltage source to modify a DC voltage presented to the DC side of the converter limb and/or modify an AC voltage and an AC current on the AC side of the converter.

2. A power electronic converter according to claim 1, wherein the or each energy storage device includes a capacitor, a fuel cell, a battery or an auxiliary AC generator with an associated rectifier.

3. A power electronic converter according to claim 1, wherein each self-commutated switching element includes a semiconductor device.

4. A power electronic converter according to claim 3 wherein the semiconductor device is an insulated gate bipolar transistor, a gate turn-off thyristor, a field effect transistor or an integrated gate commutated thyristor.

5. A power electronic converter according to claim 1, wherein the or each auxiliary converter is operable to generate a voltage to offset the voltage across a line-commutated thyristor and thereby minimise the voltage across the respective line-commutated thyristor.

6. A power electronic converter according to claim 1, wherein the or each auxiliary converter is operable to generate a voltage to oppose the flow of current created by a fault, in use, in the AC or DC networks.

7. A power electronic converter according to claim 1, wherein the or each first converter block includes one or more parallel-connected sets of series-connected line-commutated thyristors.

8. A power electronic converter according to claim 7 wherein a mid-point between the series-connected line-commutated thyristors of the or each parallel-connected set defines a first AC terminal for connection in use to a respective phase of an AC network.

9. A power electronic converter according to claim 7 wherein a first converter block is connected in series with a second converter block on the DC side of the circuit to define a two-terminal DC network for multi-phase electrical power transmission, the first converter block including a plurality of parallel-connected sets of series-connected line-commutated thyristors, the first AC terminal of each parallel-connected set being connected to a respective phase of the AC network, the second converter block including a plurality of auxiliary converters, each auxiliary converter including a second AC terminal for connection in use to a respective phase of the AC network, wherein the or each parallel-connected set of series-connected line-commutated thyristors and the or each auxiliary converter are operable to modify an AC voltage of the associated phase of the AC network.

10. A power electronic converter according to claim 9, wherein a mid-point of each chain-link converter defines a second AC terminal for connection in use to a respective phase of the AC network.

11. A power electronic converter according to claim 9 wherein the power electronic converter is connected in use to the AC network via a transformer such that the first AC terminals of the first converter block is connected in use to secondary windings of the transformer and the second AC terminals of the second converter block is connected in use to tertiary windings of the transformer.

12. A power electronic converter according to claim 1 wherein the or each converter limb includes a first converter block connected in series between two second converter blocks to define first and second limb portions, each limb portion including at least one line-commutated thyristor connected in series with an auxiliary converter between a respective one of the first and second DC terminals and the respective first AC terminals, each line-commutated thyristor and each auxiliary converter of each limb portion being operable to switch the respective limb portion in and out of circuit to generate a voltage waveform at the respective AC terminal.

13. A power electronic converter according to claim 12 including multiple converter limbs, the first AC terminal of each converter limb being connected in use to a respective phase of a multi-phase AC network.

14. A power electronic converter according to claim 13 including two converter limbs and further including a pair of DC link capacitors connected in series between the first and second DC terminals of each converter limb and connected in parallel with each converter limb, a mid-point between the DC link capacitors defining a third AC terminal for connection in use to a phase of the AC network.

15. A power electronic converter according to claim 1 wherein the or each converter limb includes two second converter blocks connected in series between the line-commutated thyristors of the respective first converter block to define first and second limb portions, a mid-point between the two second converter blocks defining the first AC terminal of the or each converter limb, each limb portion including at least one line-commutated thyristor connected in series with an auxiliary converter between a respective one of the first and second DC terminals and the respective first AC terminals, each line-commutated thyristor and each auxiliary converter of each limb portion being operable to switch the respective limb portion in and out of circuit to generate a voltage waveform at the respective first AC terminal.

16. A power electronic converter according to claim 1 wherein at least one thyristor is connected in parallel with a second converter block, the auxiliary converter of the second converter block being operable to provide a commutating voltage to switch the associated line-commutated thyristor to an off state.

17. A power electronic converter according to claim 1 further including at least one bypass mechanism operably associated with an auxiliary converter wherein the or each bypass mechanism is operable to cause a short circuit through the bypass mechanism and thereby cause the converter current to flow through the short circuit while bypassing the respective auxiliary converter.

18. A power electronic converter according to claim 17 wherein the or each bypass mechanism is operable to cause a short circuit through the bypass mechanism upon detection of a fault in the AC or DC networks or the power electronic converter.

19. A power electronic converter according to claim 17 wherein the or each bypass mechanism is connected in parallel with the respective auxiliary converter.

20. A power electronic converter according to claim 17 wherein the or each bypass mechanism includes a switch, the bypass mechanism being operable to activate the respective switch to cause a short circuit through the activated switch.

21. A power electronic converter according to claim 20 wherein the switch is a mechanical bypass switch or a semiconductor switch.

* * * * *